(12) United States Patent
Kusase et al.

(10) Patent No.: US 6,181,043 B1
(45) Date of Patent: Jan. 30, 2001

(54) ALTERNATOR FOR VEHICLE

(75) Inventors: Shin Kusase, Obu; Atsushi Umeda, Okazaki; Tsutomu Shiga, Nukata-gun, all of (JP)

(73) Assignee: Denso Corporation, Kariya (JP)

( * ) Notice: Under 35 U.S.C. 154(b), the term of this patent shall be extended for 0 days.

(21) Appl. No.: 09/438,379

(22) Filed: Nov. 12, 1999

Related U.S. Application Data

(63) Continuation-in-part of application No. 09/188,570, filed on Nov. 10, 1998.

(30) Foreign Application Priority Data

| Dec. 10, 1997 | (JP) | ..... 9-362063 |
| Apr. 21, 1998 | (JP) | ..... 10-128341 |
| May 7, 1998 | (JP) | ..... 10-124776 |
| May 25, 1998 | (JP) | ..... 10-143009 |
| Aug. 6, 1999 | (JP) | ..... 11-22435 |

(51) Int. Cl.⁷ ................. H02K 3/04; H02K 3/28
(52) U.S. Cl. ............ 310/201; 310/180; 310/184; 310/42
(58) Field of Search ............... 310/201, 180, 310/179, 184, 42, 254; 29/596

(56) References Cited

U.S. PATENT DOCUMENTS

| 1,822,261 | 9/1931 | Apple | 310/201 |
| 1,843,589 | 2/1932 | Apple | 310/201 |
| 1,917,482 | 7/1933 | Apple | 310/201 |
| 2,407,935 | 8/1946 | Perfetti et al. | 310/201 |
| 4,309,634 | 1/1982 | Koroly et al. | 310/201 |
| 5,714,824 | 2/1998 | Couture et al. | 310/208 |
| 5,778,512 | 7/1998 | Ichikawa et al. | 29/598 |

FOREIGN PATENT DOCUMENTS

| 1005611 | 5/1957 | (DE) . | |
| 3-235644 | 10/1991 | (JP) | H02K/9/06 |
| 92/06527 | 4/1992 | (WO) | H02K/3/12 |

*Primary Examiner*—Burton Mullins
(74) *Attorney, Agent, or Firm*—Pillsbury Madison & Sutro LLP

(57) ABSTRACT

In a stator of an alternator for a vehicle, a stator winding has a plurality of conductor segments having ends extending in opposite directions and a plurality of ball-shaped connected portion between the conductor segments forming continuously connected coils. Each of the ball-shaped connected portions is composed of one end of one conductor segment and the other end of another conductor segment.

20 Claims, 10 Drawing Sheets

ALTERNATOR FOR VEHICLE

CROSS REFERENCE TO RELATED APPLICATION

The present application is a CIP Application of application Ser. No. 09/188,570 filed Nov. 10, 1998, which is based on and claims priority from Japanese Patent Applications Hei 9-362063 filed on Dec. 10, 1997, Hei 10-128341 filed on Apr. 21, 1998, Hei 10-124776 filed on May 7, 1998, Hei 10-143009 filed on May 25, 1998, and Hei 11-224335 filed on Aug. 6, 1999, the contents of which are incorporated herein by reference.

BACKGROUND OF THE INVENTION

1. Field of the Invention

The present invention relates to a stator of a vehicle alternator.

2. Description of the Related Art

An alternator disclosed in JP-A-3-235644 has a pair of cooling fans fixed to opposite sides of a rotor. The pair of inner cooling fans take cooling air into frames and discharge the cooling air from windows formed in the circumferential surface of the frames, thereby cooling the stator winding.

U.S. Pat. No. 1,822,261 and WO92/06527 disclose a plurality of U-shaped conductor segments welded to form a stator winding. However, sharp edges may be formed on the welded portions. Such edges may cause concentration of mechanical stress and electrochemical stress, thereby resulting in mechanical breakdown or electrochemical corrosion. Moreover, dust or foreign particles introduced with the cooling air may accumulate on the edges if such a stator winding is cooled by such a inner cooling fans. If salt water is introduced by the inner cooling fans, insulation members disposed in the stator may be deteriorated.

SUMMARY OF THE INVENTION

The present invention is to prevent such mechanical and electrochemical troubles on the connected portion of conductor segments forming a stator winding.

In a stator of an alternator for a vehicle according to a main aspect of the invention, the stator winding is composed of a plurality of conductor segments having end portions extending in opposite direction to each other and a plurality of ball-shaped connected portions between the conductor segments to form continuously connected coils. Each of the ball-shaped connected portions includes one end of one conductor segment and the other end of another conductor segment.

Preferably, the ball-shaped connected portions are disposed at the same end of said stator core. Each of the conductor segments can have a U-shaped portion.

The conductor segments are preferably welded by a non-contact type welder, such as a tungsten inert gas (TIG) welder, to form the connected portions into a ball shape.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

A stator of a vehicle alternator according to a first embodiment of the invention is described with reference to FIGS. 1–6.

Figure 1:
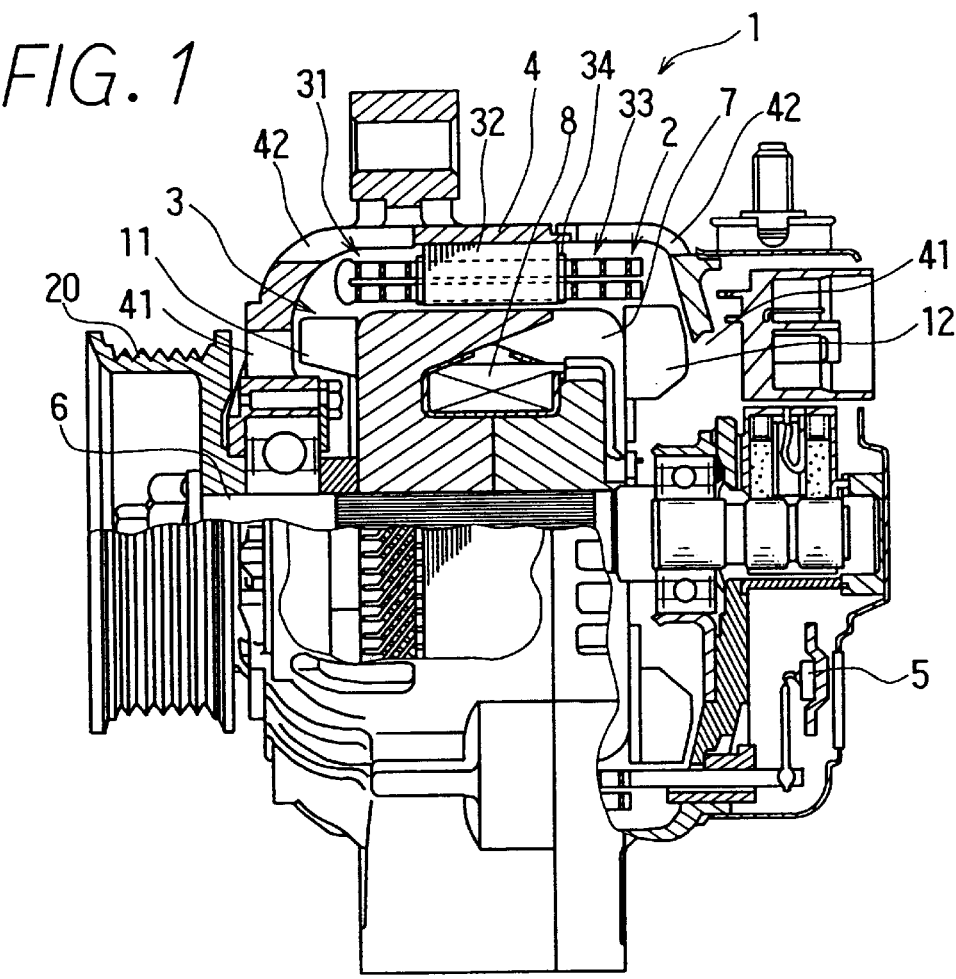
FIG. 1 is a cross-sectional view illustrating the whole structure of a vehicle alternator having a stator according to a first embodiment of the invention.

In FIG. 1, vehicle alternator 1 is composed of stator 2, rotor 3, a pair of frames 4, rectifier 5 and others.

Stator 2 is composed of stator core 32, a plurality of conductor segments 33 forming a stator winding and insulator 34 disposed between stator core 32 and the conductor segments 33. Stator core 32 is a laminate of cylindrical thin steel sheets which has a plurality of slots in the inner periphery thereof. Conductor segments 33 extend from stator core 32 to form coil ends 31.

Rotor 3 is composed of cylindrical field coil 8, a pair of pole cores 7 respectively having six claw poles which enclose field coil therebetween and shaft 6 press-fitted to the pair of cores 7. Rotor 3 has a mixed flow type cooling fan 11 at the front end thereof to supply cooling air from front portions of the rotor in the axial and radial directions and a centrifugal type cooling fan 12 at the rear end thereof to supply cooling air from rear portions of the rotor in the radial direction.

The pair of frames 4 accommodates and supports stator 2 and rotor 3 so that rotor 3 can rotate about shaft 6 and stator core 2 can be disposed around circumference of rotor 3 at a certain air gap. The pair of frames 4 has air-discharge windows 42 at the portions thereof opposite to coil ends 31 of stator 2 and air-intake windows 41 at the axially opposite surfaces thereof.

Vehicle alternator 1 is driven to rotate by an engine (not shown) via pulley 20 and a belt. When field coil 8 is supplied with exciting current, the claw poles of the pair of pole cores 7 are excited to generate three-phase ac voltage in the stator winding, and dc power is supplied from output terminals of rectifier 5.

Figure 2:
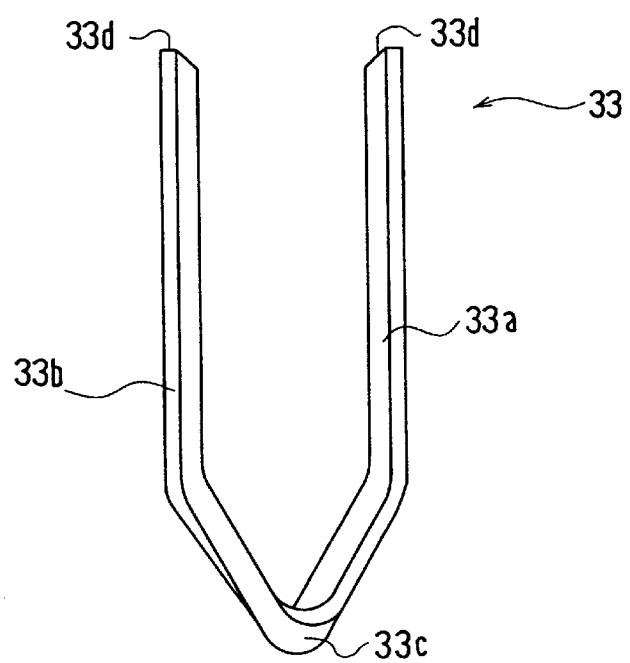
FIG. 2 is a perspective view of a conductor segment of the stator according to the first embodiment.

As shown in FIG. 2, each of the U-shaped copper conductor segments 33 has U-turn portion 33c, inner-portion 33a to be disposed in one of slots 35 at a circumference inside U-turn portion 33c and outer-portion 33b to be disposed in another of slots 35 at a circumference outside U-turn portion 33c. Each of inner-portion 33a and outer-portion 33b has a straight portion to be disposed in one of slots 35 and a portion to extend outward from the one of slots 35.

Figure 3:
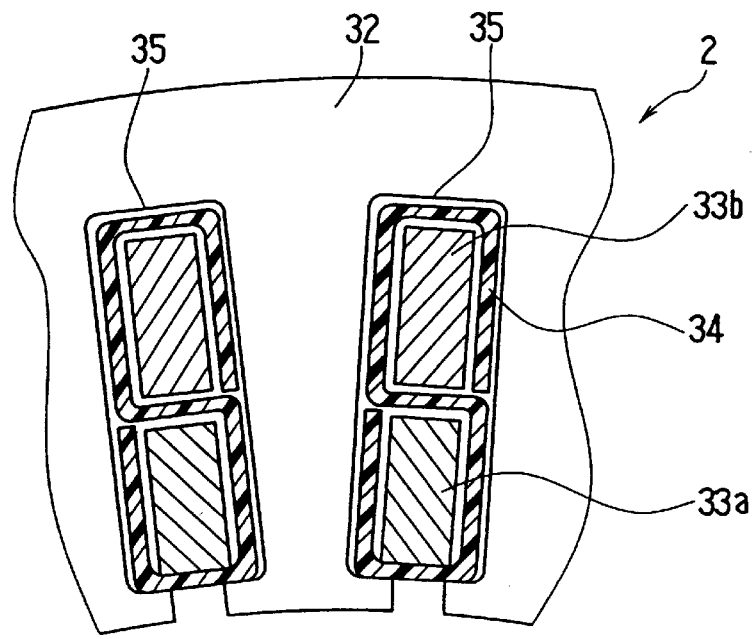
FIG. 3 is a fragmentary schematic cross-sectional view of the stator according to the first embodiment.

When the stator winding is formed, two conductor segments 33 are inserted in every one of slots 35 and each end portion 33d is connected with a different end portion 33d extending from a different one of slots 35. As shown in FIG. 3, both inner-portion 33a and outer-portion 33b have a rectangular cross-section with the radial sides being longer than the circumferential sides. Because conductor segments 33 are not coated with insulating material, a S-shaped insulator 34 is disposed in each of slots 35 to insulate two conductor segments from each other.

Figure 4:
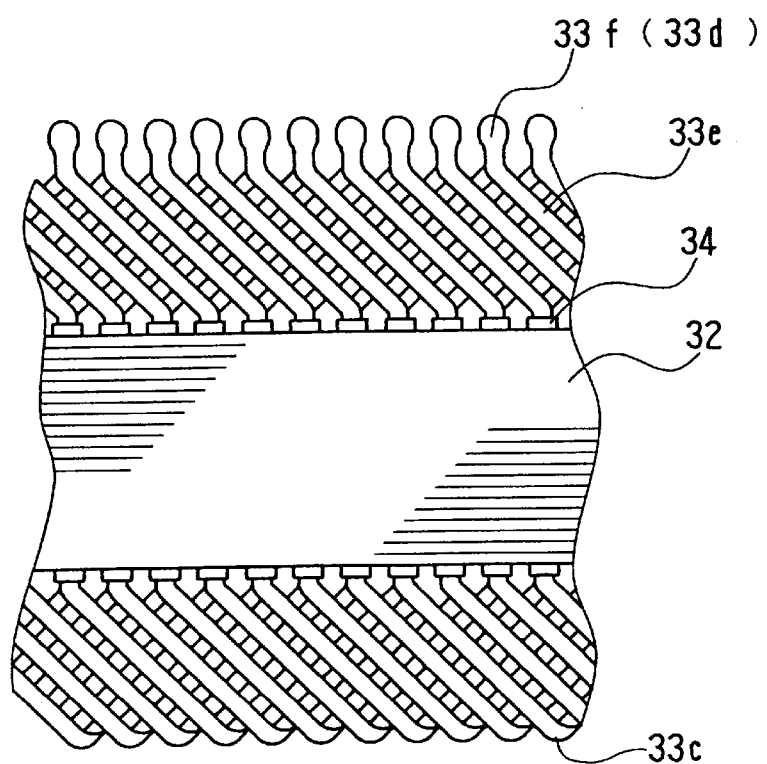
FIG. 4 is a fragmentary side view of the stator according to the first embodiment.
Figure 5A:
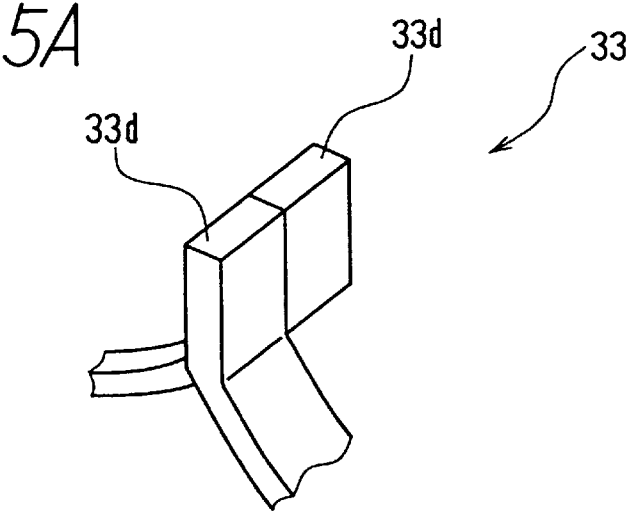
FIG. 5A is a perspective view illustrating a connected portion before welding of the conductor segments illustrated in FIG. 2.

As shown in FIG. 4, U-turn portions 33c are disposed at the same end of stator core 32. Inclined portions 33e extending left are formed from outer-portion 33b, and inclined portions 33e extending right are formed from inner-portion 33a to form uniform coil ends 31. Each of connected portions 33f is formed to join another as shown in FIG. 5A.

Joining end portions 33d are welded together by a contactless type welder such as a tungsten inert-gas welder (hereinafter referred to as the TIG welder) so that only limited area of end portions can be melted to form ball-shaped or raindrop-shaped connected portions 33f. The TIG welder discharges arc current between a tungsten electrode and a base metal member in an inert gas to melt the base metal member and a filler metal member for welding. The TIG welder can control quantity of heat and quantity of filler material separately.

End portions 33d of neighboring conductor segments 33 are put side by side, and a nozzle having a tungsten electrode is brought near the end portions 33d to be welded by the TIG welder.

Figure 5B:
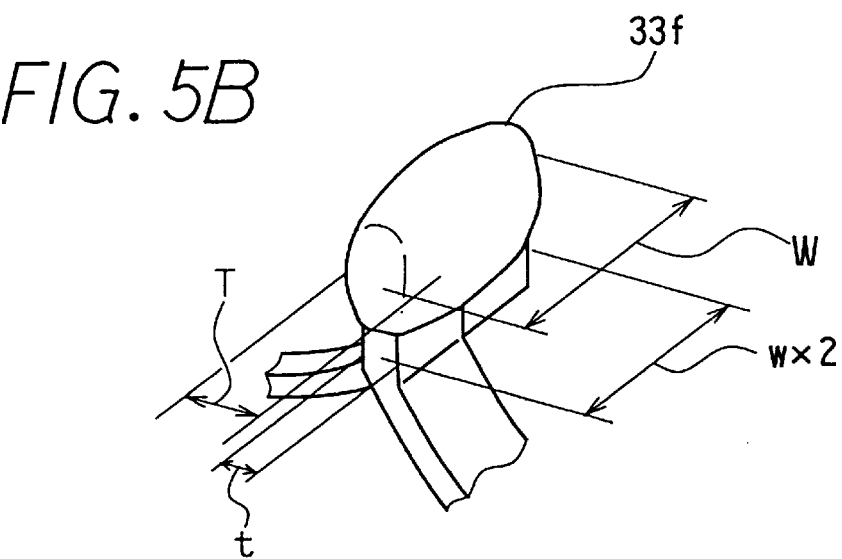
FIG. 5B is a perspective view of the connected portion after welding.
Figure 5C:
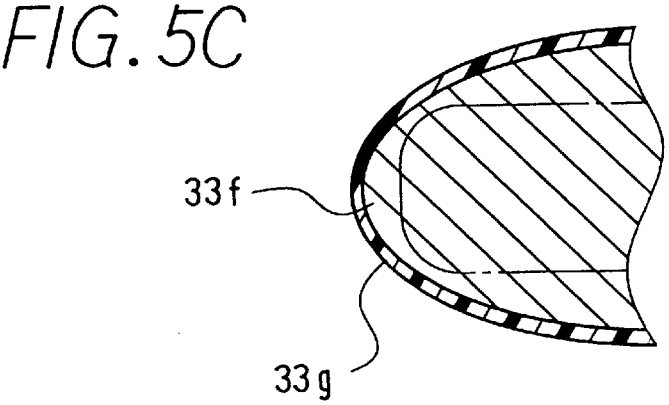
FIG. 5C is a schematic cross-sectional view of the connected portion.

Because conductor segments 33 made of copper are highly heat conductive, each of connected portions 33f is melted wide enough to form a raindrop-shaped ball without any edge due to surface tension as shown in FIG. 5B. Each of connected portions 33f becomes larger than conductor segment 33 both in thickness (T>t) and in width (W>2w). Thus, sufficient mechanical strength and electrical connection can be provided at the connected portions 33f. The edge-less ball-shaped portions are free from concentration of stresses and corrosion. The ball-shaped surface of the connected portion 33f is coated evenly with resinous film 33g for protection and insulation as shown in FIG. 5C.

The stator winding is formed as follows. U-shaped conductor segments 33 are inserted into respective slots 35 of stator 2 so that U-turn portions 33c are disposed on the same axial end of stator core 32, so that outer-portions 33b are disposed at the inner portion of slots 35 (or an outer circumference of stator core 32), and inner-portion 33a are disposed in the outlet portion of slots 35 (or an inner circumference of stator core 32) as shown in FIG. 3.

Each of conductor segments 33 is manufactured as follows. A copper plate is bent and press-formed into a U-shape so that opposite sides of outer-portion 33b and inner-portion 33a are inserted in one of slots 35 to be in contact with the parallel side walls of one of slots 33 via insulator 34.

Figure 6:
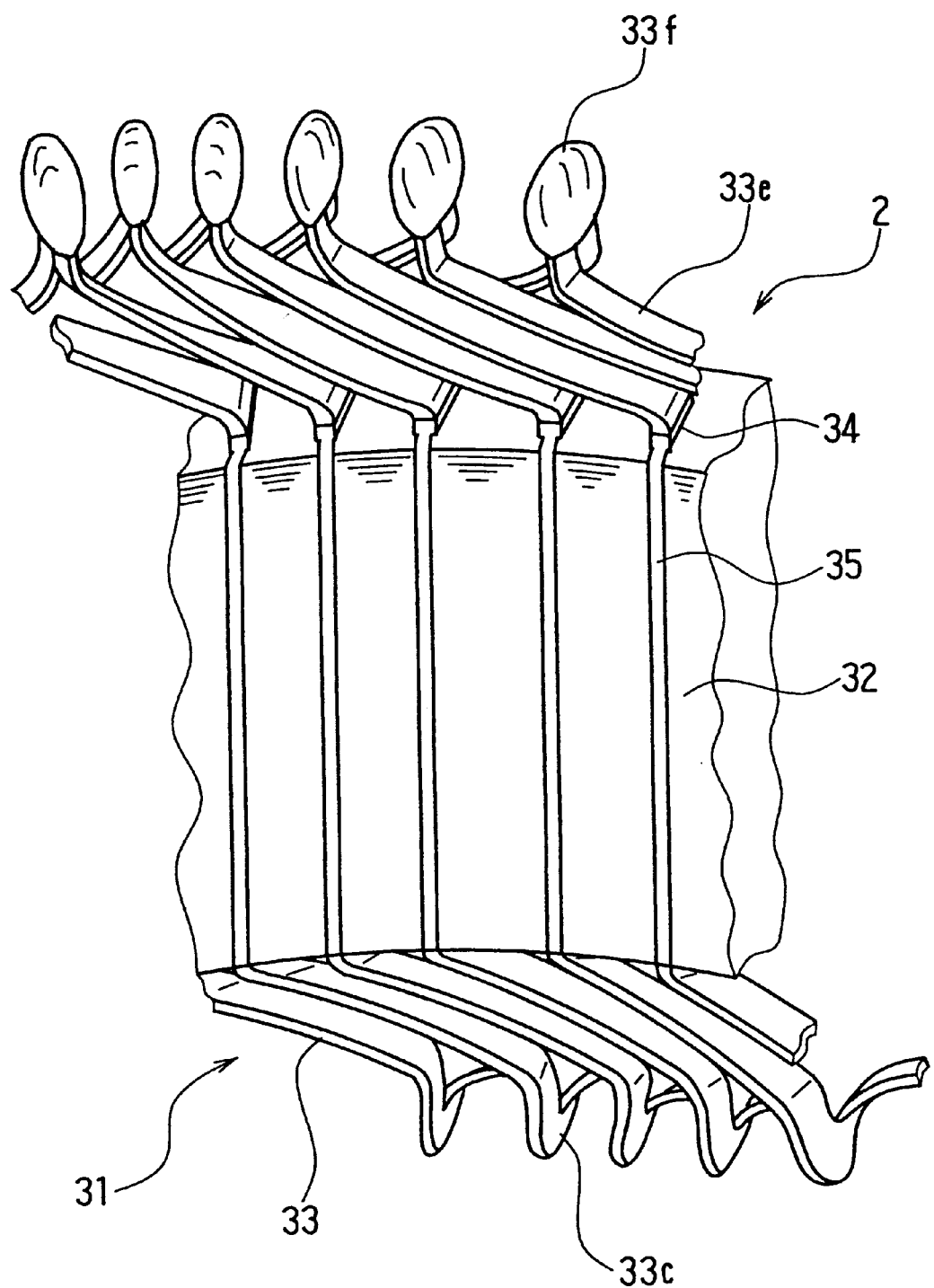
FIG. 6 is a perspective view illustrating coil ends of the stator according to the first embodiment.

As shown in FIG. 6, each of two end portions 33d of one of conductor segments 33 is bent in the circumferential direction opposite to each other so that outer-portion 33b of the one of conductor segments 33 can be connected to inner-portion 33a of another of conductor segments extending from different one of slots 35 and inner-portion 33a of the former can be connected to outer-portion 33b of another of conductor segments 33 extending from different one of slots 35 at end portions 33d, thereby forming a ring of connected portions 33f, at a certain height from stator core 32. Then, connected portions 33f is dipped in a tank of liquid insulation material, and taken out from the tank to form uniform insulation film on connected portions 33f.

Because all end portions 33d are disposed on the same end of stator core 32, the connection can be carried out by a TIG welder without turning the stator core 32. Because all conductor segments 33 are almost the same in shape and connected portions 33f are located at the same height, the dipping process for the insulation of all connected portions 33f can be carried out at the same time. Thus, the insulation process can be made simple, and production cost can be reduced.

Second Embodiment

Figure 7:
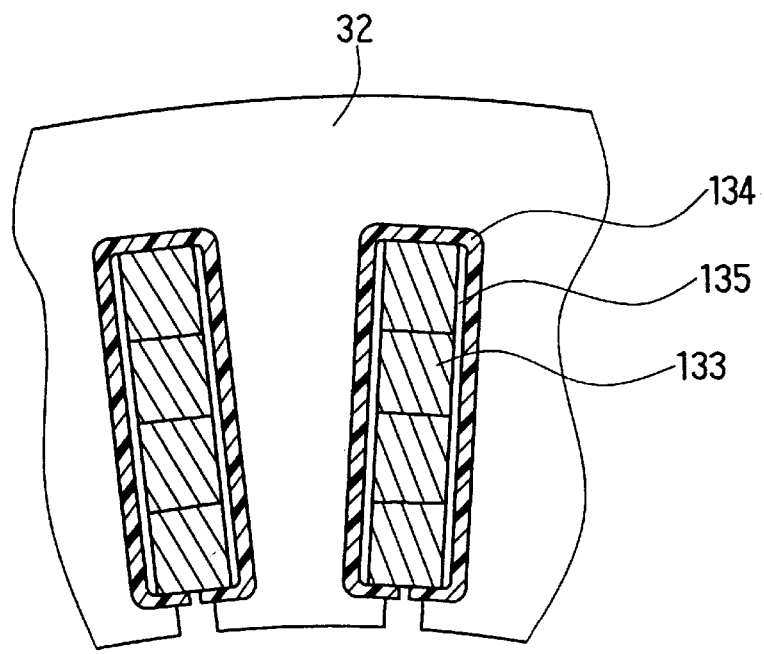
FIG. 7 is a fragmentary cross-sectional view of the stator according to a second embodiment of the invention.
Figure 8:
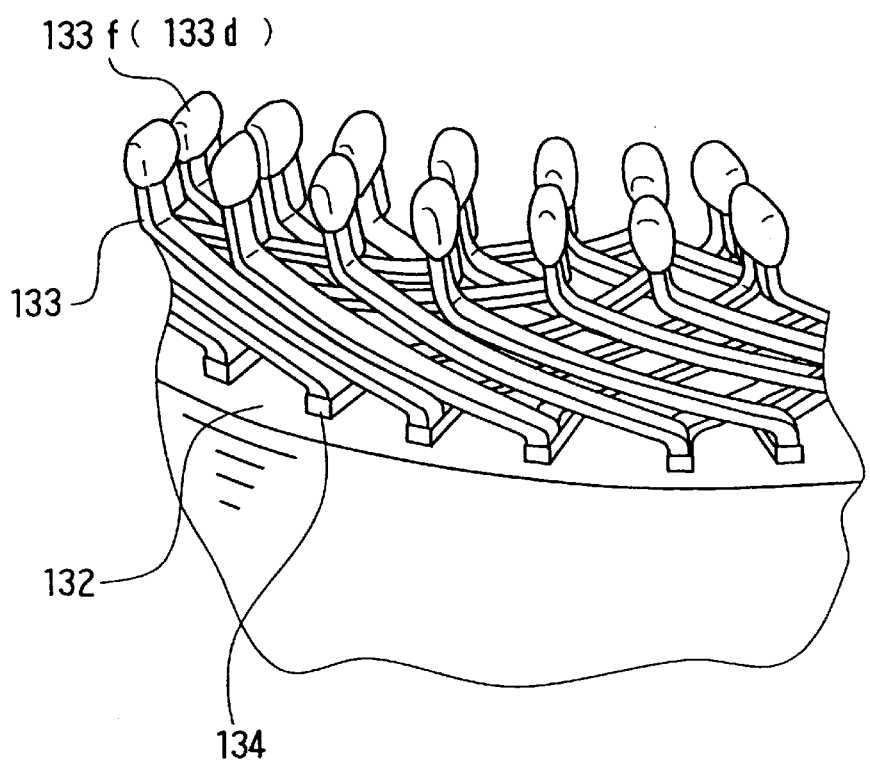
FIG. 8 is a fragmentary perspective view of the stator according to the second embodiment.

The number of conductor members per slot can be increased to more than two. As shown in FIG. 7, a stator according to a second embodiment of the invention has four conductor segments 133 aligned in the radial direction in one of slot 135. Conductor segments 133 have insulation coating thereon, and a insulator 134 is disposed between conductor segments 133 and inner wall of slot 135. The connected portions are shown in FIG. 8. Four conductor segments 133 in one of slots 135 extends alternately in the opposite circumferential directions. That is, the outermost segments extend clockwise, and the innermost segments extend counter-clockwise, as shown in FIG. 8. End portions 133d of conductor segments 133 extending from one of slots 135 are respectively connected to end portions 133d extending from different one of slots 135 spaced apart at a certain pitch therefrom. In other words, the innermost conductor segments 133 are connected respectively to the second inner conductor segments 133, and third inner conductor segments 133 are connected respectively to the outermost conductor segments 133. Accordingly, a plurality of connected portions 133*f* are formed into two rings so that each of connected portions 133*f* is spaced apart from another in both radial and circumferential directions. All the connected portions 133*f* are welded by a TIG welder to have edgeless raindrop shape in the manner substantially the same as the stator according to the first embodiment.

The above structure is effective to provide a smaller-sized vehicle alternator having the same number of slots 35, the distance between the connected portions is closer.

Third Embodiment

Figure 9:
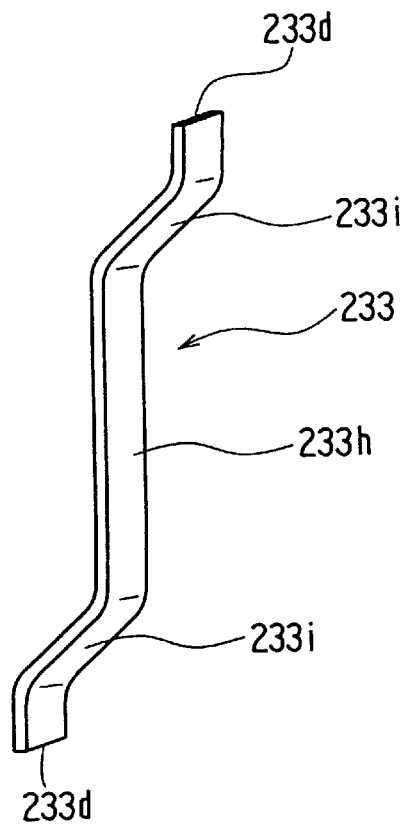
FIG. 9 is a perspective view of a conductor segment of a stator according to a third embodiment of the invention.
Figure 10:
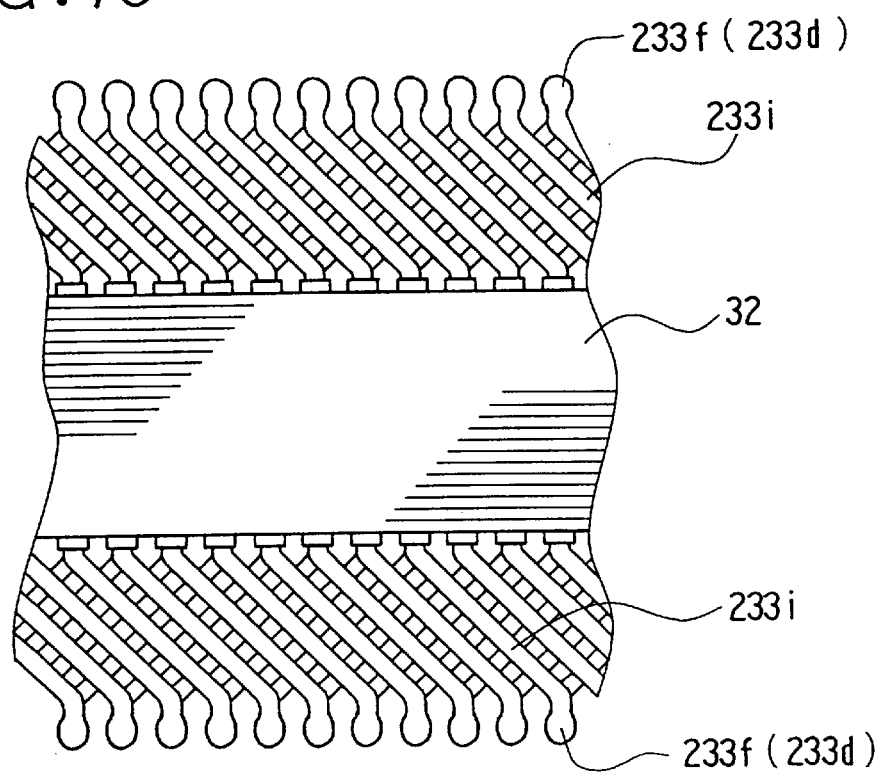
FIG. 10 is a fragmentary side view of the stator according to the third embodiment.

Conductor segments 33 illustrated in FIG. 2 can be separated at the middle of U-turn portion, as shown in FIG. 9. Such conductor segments 233 can be used to a stator according to a third embodiment of the invention. In FIG. 9, conductor segment 233 is composed of straight inner portion 233*h* and outer portions 233*i* extending axially outward from opposite ends of inner portion 233*h*. Outer portions 233*i* incline at a certain angle to the axial direction so that end portions 233*d* extending from one of slots can be welded to end portions 233*d* extending from another slot to form a stator winding. Connected portions 233*f* are formed at both ends of the stator core and cooled by the pair of cooling fans 11, 12 (FIG. 1). The connected portions 233*f* are also formed into an edgeless raindrop shape as described before.

Fourth Embodiment

Figure 11:
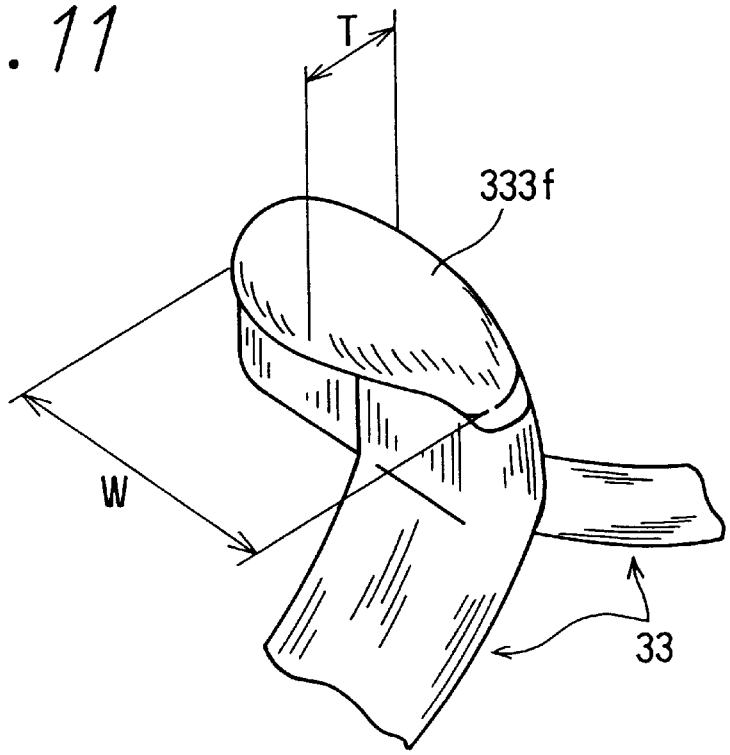
FIG. 11 is a perspective view illustrating a connected portion of the conductor segments after welding of a stator according to a fourth embodiment.

Each connected portion 33*f* shown in FIG. 5B can be substituted by connected portion 333*f* shown in FIG. 11. Connected portion 333*f* is shaped like a slender pillow or a rugby ball, which is smaller than that shown in FIG. 5B. Connected portion 333*f* has a shape solidified from a liquid drop and has a smooth roundish surface.

Figure 12:
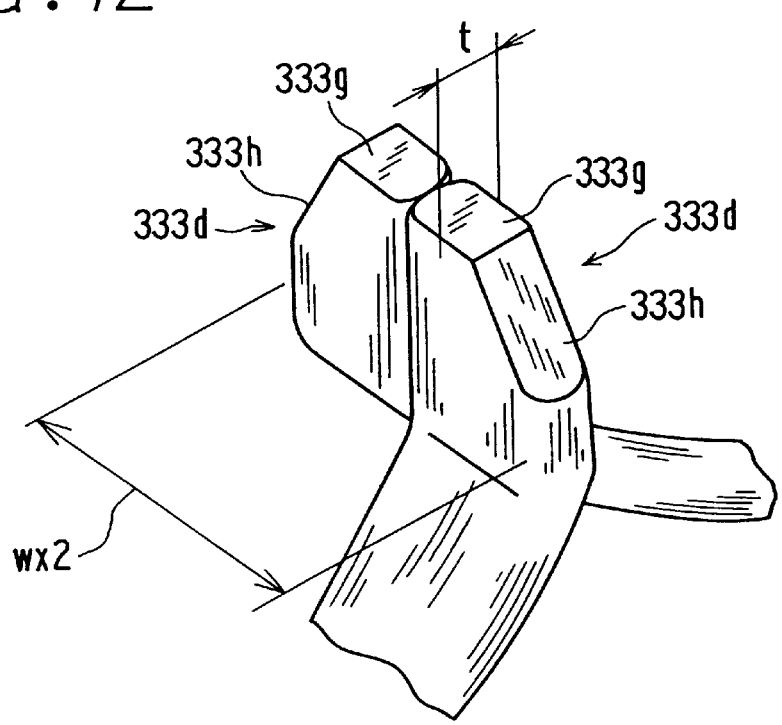
FIG. 12 is a perspective view illustrating the connected portion before welding of the conductor segments shown in FIG. 11.

End portion 333*d* before TIG welding is shown in FIG. 12. End portion 333*d* is made of copper and has edge 333*g* and sloped surfaces 333*h*. Accordingly, end portion 333*d* has a decreasing cross-section, as shown in FIG. 12. Adjacent two end portions 333*d* are put together to form a trapezoid. Because of a reduced volume to be welded by TIG welder, connected portion 333*f* becomes smaller than connected portion 33*f* shown in FIG. 5B. Connected portion 33*f* has width W which is equal to or smaller than double the width w of the conductor member. The thickness T of connected portion 333*f* is a little larger than the thickness t of the conductor member. These sizes varies a little between connected portions 333*f*, and the sloped surface may remain after the welding. However, the surfaces around the remaining sloped surface are not so sharp to be eliminated.

Edge 333*g* is entirely melted and sharp edges shown in FIG. 12 are eliminated.

Connected portion 333*f* is disposed so that the thickness W can be aligned with the radial direction of the stator. Because all connected portions 333*f* are disposed in the circumferential direction, compact connected portion as shown in FIG. 11 provides more spaces between connected portions 333*f*.

Fifth Embodiment

Figure 13:
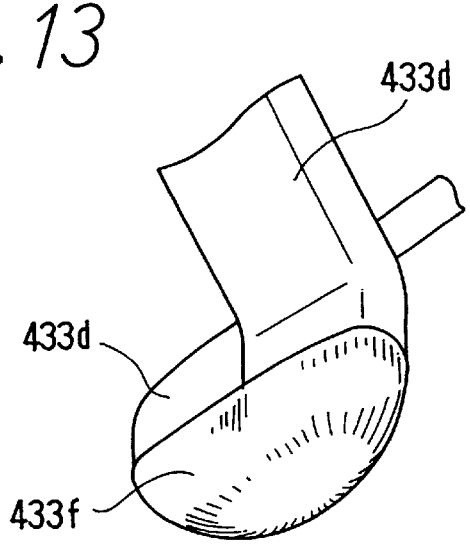
FIG. 13 is a perspective view illustrating a connected portion after welding of the conductor segments of a stator according to a fifth embodiment.
Figure 14:
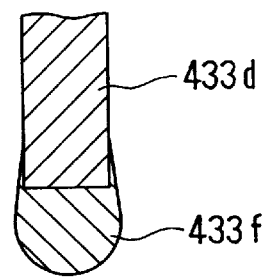
FIG. 14 is a cross-sectional side view of the connected portion shown in FIG. 13 cut in the circumferential direction of the stator.
Figure 15:
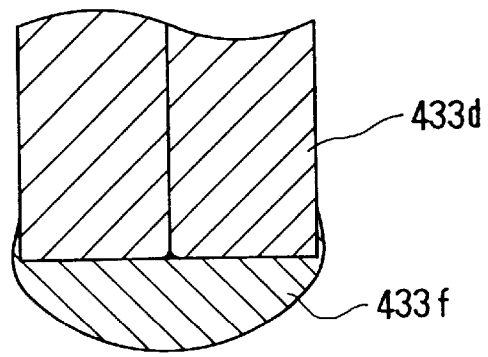
FIG. 15 is a cross-sectional side view of the connected portion shown in FIG. 13 cut in the radial direction of the stator.

Each of connected portion 33*f* shown in FIG. 5B can be also substituted by connected portion 433*f* shown in FIG. 13. Connected portion 433*f* is shaped like a liquid ball hanging down, a raindrop, or a flat ball. As shown in FIGS. 14 and 15, connected portion 433*f* covers the edge and side surfaces of end portion 433*d*, thereby covering all sharp corner edges. Connected portion 433*f* has a shape solidified from a liquid drop and has a smooth roundish surface.

Figure 16:
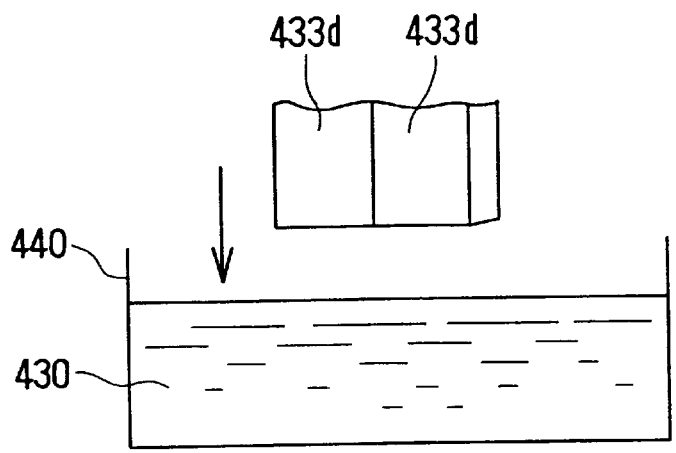
FIG. 16 is a schematic diagram illustrating a soldering step of the connected portion shown in FIG. 13.

Connected portion 433*f* shown in FIG. 13 is formed according to the following steps. As shown in FIG. 16, melted solder 430 is put in tank 440, and end portion 433*d* is dipped therein by a suitable length. Then, end portion 433*d* is taken out to coat melted solder 430 on end portion 433*d*. Melted solder 430 forms into the shape shown in FIG. 13 by its capillary attraction. The same shape is maintained when the solder cools and becomes solid. Solder 430 can be a soft solder, a copper solder, or the like.

Variations

Figure 17:
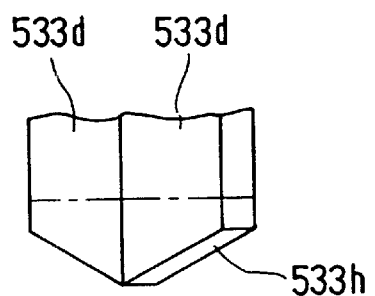
FIG. 17 is a perspective view illustrating a connected portion before welding of the conductor segments of a variation of the stator according to the preferred embodiments of the invention.
Figure 18:
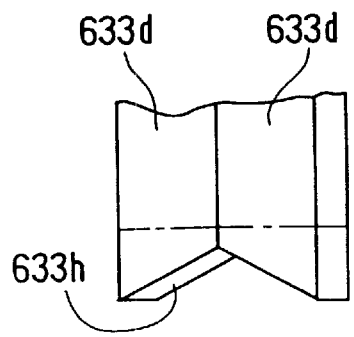
FIG. 18 is a perspective view illustrating a connected portion before welding of the conductor segments of another variation of the stator according to the preferred embodiments of the invention.

As shown in FIGS. 17 and 18, end portion 533*d* or end portion 633*d* can be substituted for end portion 433*d*.

End portion 533*d* has sloped surfaces 533*h* to form a V-shaped convex edge. End portion 633*d* has inverted sloped surfaces 633*h* to form a V-shaped convex edge. These edges provide a wide surface to be covered by solder. Each of end portions 533*d* and 633*d* is dipped into melted solder 430 to the level indicated by a one-dot chain line. As a result, all sharp corner edges of end portions 533*d* and 633*d* are covered with the solder.

Figure 19:
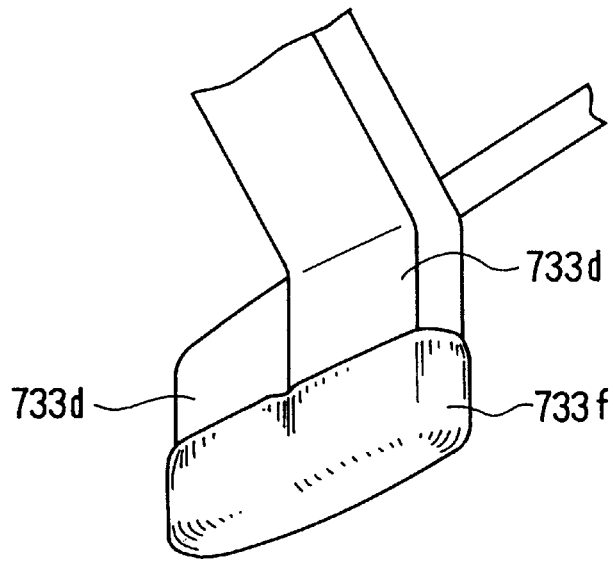
FIG. 19 is a perspective view illustrating a connected portion after welding of the conductor segments of another variation of the stator according to the preferred embodiments of the invention.
Figure 20:
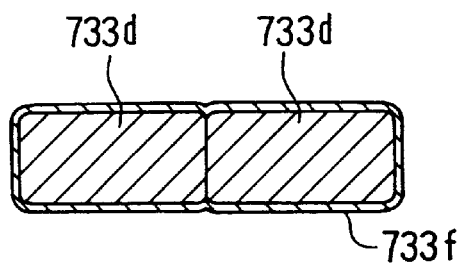
FIG. 20 is a cross-sectional plan view of the connected portion shown in FIG. 19.
Figure 21:
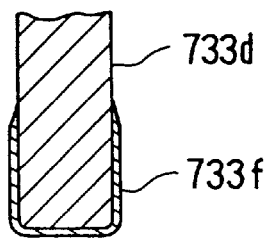
FIG. 21 is a cross-sectional side view of the connected portion shown in FIG. 19 cut in the circumferential direction of the stator.

As shown in FIGS. 19–21, end portion 733*d* can be substituted for end portion 433*d*. End portion 733*d* is dipped into melted solder having lower viscosity than melted solder 430 of the precedent embodiments so that connected portion 733*f* can be formed more rectangular than connected portion 433*f*. This reduces the size of connected portion 733*f*, providing longer distance between adjoining connected portions 733*d*.

It is also possible to provide a single centrifugal cooling fan to cool connected portions 33*f* instead of a pair of cooling fans. The cooling fan can be axial flow fan also. The ball-shaped connected portions can be applied to an any kind of electric machine having water cooling structure. The cross-section of conductor segments 33 can be circular, elliptic or polygonal. A contactless arc welder other than TIG welder can be applicable to connect end portions 33*d* of conductor segments 33.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of an alternator for a vehicle including a stator core having a plurality of slots and stator windings disposed in said plurality of slots, wherein said stator winding comprises a plurality of conductor segments having a plurality of ball-shaped connected portions between said conductor segments thereby forming continuously connected coils, and each of said ball-shaped connected portions comprises an end of one of said conductor segments and an end of another of said conductor segments.

2. The stator as claimed in claim 1, wherein said ball-shaped connected portions are disposed at the same end of said stator core.

3. The stator as claimed in claim 2, wherein
each of said conductor segments has a U-shaped portion.

4. The stator as claimed claim 1, wherein
each of said connected portions is disposed to receive cooling air from the inside of said stator.

5. The stator as claimed in claim 1, wherein
each of said conductor segments is welded by a non-contact type welder.

6. The stator as claimed in claim 5, wherein
said non-contact type welder is a TIG welder.

7. The stator as claimed in claim 1, wherein
every two of said conductor segments are disposed in one of said slots.

8. The stator as claimed in claim 1, wherein
said ball-shaped connected portions are disposed at the same height from said stator core.

9. The stator as claimed in claim 1, wherein
each of said conductor segments has a rectangular cross section at both ends,
said rectangular cross section has radial sides longer than circumferential sides, and
an end of one of said conductor segments and an end of another of said conductor segments are disposed side by side.

10. The stator as claimed in claim 9, wherein
each of said connected portions is larger in both thickness and width than any one of said conductor segments.

11. The stator as claimed in claim 10, wherein
each of said connected portion has a shape that has radial size longer than circumferential size.

12. The stator as claimed in claim 11, wherein
said connected portions are disposed in a circumferential line.

13. The stator as claimed in claim 11, wherein
said connected portions are disposed in a plurality of circumferential lines.

14. The stator according to claim 1, wherein each of said connected portions has a smooth roundish surface having a radius larger than said end portion.

15. The stator as claimed in claim 14, wherein each of said connected portions has said roundish surface swelling in the axial direction of said stator.

16. The stator as claimed in claim 14, wherein each of said connected portions comprises a soldering member on said segment end.

17. An alternator for a vehicle including a stator core and a rotor, said stator having a plurality of slots and a polyphase winding disposed in said plurality of slots, wherein each of said phase windings comprises a plurality of continuous conductors having both ends on a coil-end of said phase winding and a plurality of drop-shaped connected portions located on said coil-end of said phase-winding, each said drop-shaped connected portion connecting two of said conductors at said ends and having a smooth surface.

18. An alternator for a vehicle as claimed in claim 17, wherein each said drop-shaped connected portion covers the entire edge on said end of said conductor.

19. An alternator for a vehicle as claimed in claim 17, wherein each said drop-shaped connected portion comprises both ends of said two of said conductors.

20. An alternator for a vehicle including a stator core and a rotor, said stator having a plurality of slots and a polyphase stator winding disposed in said plurality of slots, wherein each of said phase winding comprises a plurality of continuous conductors having both ends on a coil-end of said phase winding and a plurality of connected portions located on said coil-end of said phase winding connecting two of said conductors in series at said ends, said connected portion being a drop-shape which remains after melting at an end surface of said ends.

* * * * *

UNITED STATES PATENT AND TRADEMARK OFFICE
CERTIFICATE OF CORRECTION

PATENT NO. : 6,181,043 B1
DATED : January 30, 2001
INVENTOR(S) : Kusase et al.

Page 1 of 1

It is certified that error appears in the above-identified patent and that said Letters Patent is hereby corrected as shown below:

<u>Title page,</u>
Item [30], change Foreign Application Priority Data number "JP-A-11-22435" to
-- JP-A-11-224335 --.

Signed and Sealed this

Thirtieth Day of October, 2001

Attest:

*Attesting Officer*

NICHOLAS P. GODICI
*Acting Director of the United States Patent and Trademark Office*